United States Patent [19]

Miesak

[11] 4,453,448

[45] Jun. 12, 1984

[54] METHOD AND APPARATUS FOR TUNING PERCUSSION INSTRUMENTS

[76] Inventor: Edward J. Miesak, 1132 Stutz Dr., NE., Albuquerque, N. Mex. 87123

[21] Appl. No.: 469,371

[22] Filed: Feb. 24, 1983

[51] Int. Cl.³ ........................ G10G 7/02; G10D 13/04; G01B 7/16

[52] U.S. Cl. ........................................ 84/454; 84/419; 73/771

[58] Field of Search ............. 84/454, 477 R, DIG. 18, 84/419; 73/765, 768, 771, 772

[56] References Cited

U.S. PATENT DOCUMENTS

| | | | |
|---|---|---|---|
| 3,163,075 | 12/1964 | Toperzer, Jr. | 84/419 |
| 3,197,697 | 7/1965 | McCauley | 73/771 X |
| 3,509,264 | 4/1970 | Green | 84/1.15 |
| 3,805,600 | 4/1974 | Powell et al. | 73/771 X |
| 4,023,462 | 5/1977 | Denov et al. | 84/454 |
| 4,056,998 | 11/1977 | Rampton | 84/419 |
| 4,248,094 | 2/1981 | Thompson et al. | 73/760 |
| 4,375,180 | 3/1983 | Scholz | 84/454 |

FOREIGN PATENT DOCUMENTS

| | | | |
|---|---|---|---|
| 2559092 | 7/1976 | Fed. Rep. of Germany | 84/454 |

OTHER PUBLICATIONS

Transducer Interfacing Handbook, published by Analog Devices, Inc., Route 1, Industrial Park, PO Box 280, Norwood Mass 02062.

High Performance, Economy Strain Gauge/RTD Conditioners published by Analog Devices, Inc., Route 1, Industrial Park, PO Box 280, Norwood Mass 02062.

*Primary Examiner*—William B. Perkey
*Attorney, Agent, or Firm*—Donald J. Singer; Thomas L. Kundert

[57] ABSTRACT

A tuning device for tympani that displays the pitch of each instrument's tympanum. The pitch is determined by measuring the strain in an adjustable tensioning mechanism employed in all tympani to keep proper tension on the tympanum. The pitch or tone of the tympani is determined by the vibration frequency of the tympanum when the tympani is played and the frequency is determined by the tension in the tympanum. A transducer measures the strain in the tensioning mechanism to give an accurate indication of what the tympanum tension, and therefore the pitch, of the tympani would be when played. The transducer includes a resistance-type strain gage mounted on the tympanum tensioning mechanism. The length of the conductor in the strain gage and therefore its resistance, changes with stress changes in the tensioning mechanism used to tune the tympani. A switch means selects a desired one of the strain gages mounted on each of the one or more tympani for inclusion as one section of a four-section resistance bridge circuit configuration. A signal conditioning module provides excitation to the bridge circuit and also conditions the output of the bridge circuit. The output of the bridge circuit varies as the resistance of the strain gage varies. The conditioned output of the bridge circuit is displayed on a voltmeter whose scale has been calibrated to indicate the pitch of the tympani being monitored.

10 Claims, 5 Drawing Figures

METHOD AND APPARATUS FOR TUNING PERCUSSION INSTRUMENTS

STATEMENT OF GOVERNMENT INTEREST

The invention described herein may be manufactured and used by or for the government for governmental purposes without the payment of any royalty thereon.

BACKGROUND OF THE INVENTION

Some musical instruments require tuning to a particular pitch to be played properly, and tympani present an especially difficult tuning challenge in that for many musical pieces the pitch of the tympani must be adjusted while the piece is being played. In the course of playing a single piece a tympanist may have to return each tympani several times, as well as check the pitch of the drums already tuned to assure that they are still in tune. The customary way of tuning a tympani is for the tympanist to place his ear near the tympanum of the tympani being tuned and then gently depress and release the tympanum whith his thumb to cause the tympanum to vibrate and make a sound. The tympanist listens to this sound and changes the tension in the tympanum to achieve the desired pitch, using his ear aided either by a tuning fork or a pitch pipe. Doing this during a performance, particularly without distracting nearby musicians, is difficult. The pitch or tone of the tympani is determined by the frequency at which the tympanum vibrates when the tympani is played and vibration frequency is determined by the tension in the tympanum. Tympani are generally all provided with adjustable mechanisms, usually operated by a foot pedal, for changing the tension in the tympanum to accomplish tuning. However, it has proven to be so difficult a task to tune a tympani so that it improves the music, particularly retuning in the midst of a piece when several tympani are employed, that few persons have become accomplished tympanists. As a result thre are few conductors or composers who have been able to fully exploit the potential of the tympani.

There have been a number of attempts in the prior art to provide a method and apparatus for easily and rapidly tuning a tympani. One such device is disclosed in U.S. Pat. No. 3,163,075 issued to F. M. Toperzer, Jr. There have been several mechanical devices which were intended to provide a visual indication of the pitch of the tympanum. Such devices, however, actually only provided a visual indication of the position of the foot pedal of the tympanum tension adjusting mechanism. There is, of course, a small correlation between the position of the foot pedal and the tension of the tympanum, but this type of device has not achieved wide acceptance among tympanists because of it inherent inaccuracies in monitoring the pitch. There have alos been prior art devices which have determined and adjusted the pitch of a tympanum by electrooptical means, as in U.S. Pat. No. 4,023,462 issued to Denov, et. al. Such an electro-optical device would be expensive to manufacture, more expansive to purchase, and not readily applied to an existing tympani. Another disadvantage would be that the tympani must be played for the electro-optical device to read the pitch.

There is a need for an inexpensive, easy to use tuning device that can be adapted for use on existing tympani. Such a device will make it must easier for a person to become an accomplished tympanist. This will in turn result in increased participation of the tympani in musical performances with an accompanying improvement in quality and listening pleasure provided by such performances.

SUMMARY OF THE INVENTION

The present invention provides a method and apparatus for attaining and thereafter maintaining the proper pitch of a set of tympani. The invention employs a strain measuring transducer means to indirectly measure the tension in the tympanum of a tympani, and then displays the output of the strain measuring transducer on a suitable readout means like a voltmeter. The readout is in a form that can be readily observed and interpreted by the tympanist. All known tympani have a tension adjusting mechanism, normally foot-operated, for varying the tension in the tympanum. Such tension adusting mechanisms all have a common structural member through which all tensile forces utlimately applied to the tympanum must pass. The transducer includes a resistance-type strain gage that is wired as one leg of a Wheatstone Bridge circuit. The strain gage is mounted directly on the common structural member so that its length, and therefore its resistance, varies as tension varies in the common structural member. Tension variations result in changes in the length of the common structural member. The length changes are very small but readily detectable by the strain gage. The device may include any desired number of strain gages, each mounted on a different tympani. The strain gages are connected in parallel, and through a suitable switch mechanism, so that any selected one of the strain gages can be switched into the bridge circuit for measuring the pitch of the tympani on which the selected strain gage is mounted. A signal conditioning module is electrically connected to the bridge circuit for providing electrical excitation to the bridge. The module also receives the output signal of the bridge circuit and conditions this output signal. The conditioned output signal is applied to the readout means. A power supply provides a regulated plus or minus 15 volts DC, and a ground, to the signal conditioning module. The readout means is a suitable, voltmeter provided with a face that can be marked with pitch indications by the tympanist.

The inital setup of the tuning device and tympani requires calibration and tuning by the tympanist. He does this by balancing the bridge circuit and tuning the tympani. Tuning is done with the aid of a piano, tuning fork, or other suitable source of tonal pitches. The tympanist tunes the selected tympani to a certain pitch, A for example. He then notes the position of the needle of the voltmeter meter movement for the tympani selected and then marks the letter A on the face of the voltmeter in line with the switch setting. The switch is physically positioned adjacent the voltmeter for ease of operation and observation. The tympanist then goes on tuning the tympani to pitch B, C, etc., marking each pitch on the voltmeter face to correspond to the position of the voltmeter needle. After completing the tuning of one tympani he then switches in the next tympani and goes through the tuning procedure again. He does this for each tympani in the set until all are tuned and the face of the voltmeter marked. Thereafter, to adjust or check the pitch of a particular tympani the tympanist just switches in that tympani and observes the position of the meter needle. After the initial tuning the tympanist doesn't actually need to play the tympani to determine its pitch. If the voltmeter indicates the desired pitch then not action is required. If a different pitch is desired, then the tympanist just activates the foot operated tensioning mechanism until the needle indicates the desired pitch. Complete tuning and calibration is needed only when the tympani tensioning linkages are readjusted for some reason, or the tuning device is used with a different set of tympani.

Accordingly, it is an object of this invention to provide a tympani tuning device rapid and accurate tuning adjustments to be made to a tympani, particularly during the playing of a musical score.

Another object of the invention is to provide such a device that is inexpensive to fabricate and easy to install on a tympani.

DETAILED DESCRIPTION OF THE INVENTION

Figure 1:
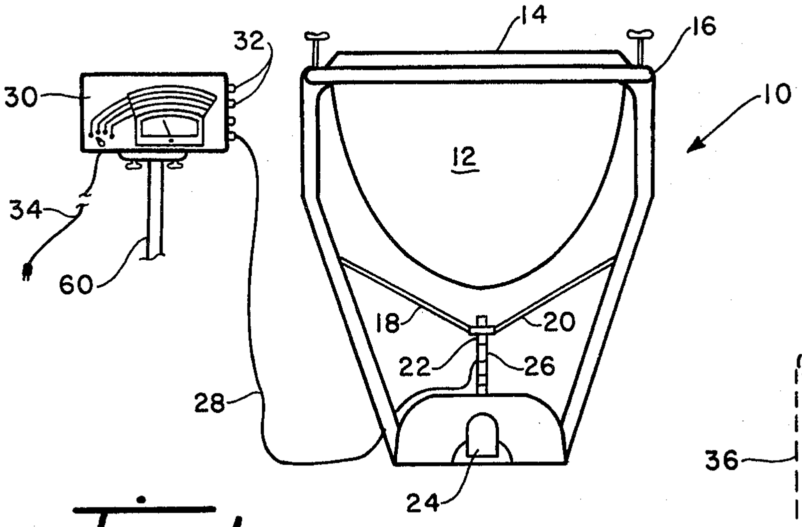
FIG. 1 is a pictorial view of a single tympani with a pitch monitoring device attached thereto.

Referring now to FIG. 1 of the drawing which illustrates a conventional tympani 10 that includes a kettle 12 over which a tympanum 14 is stretched. The tympanum is secured in a hoop assembly 16 which is pulled down by an adjustable tuning mechanism that adjusts the tension in the tympanum to change the pitch thereof. The adjustable tuning mechanism includes arms 18 and 20 which can be pulled downwardly by a centrally disposed rod 22. While only two arms are shown it should be understood that a tympani has several more such arms. Rod 22 is pulled downwardly by foot-operated mechanism 24 when additional tension in the tympanum is needed. The tension can also be relieved to change the pitch of the tympani. All the tensile stresses that are applied to arms 18 and 20, and like arms not shown, to cause hoop assembly 16 to stretch the tympanum, must pass through rod 22. Thus, rod 22 is the common structural member of the adjustable tuning mechanism through which all tensile forces affecting the pitch of the tympani must pass. A resistance strain gage 26 is bonded to rod 22 and connected by electrical cable 28 to a control and readout device 30. The control has a plurality of input jacks 32, the number of which corresponds to the number of tympani to be handled by the system. The control is provided with a power cord 34.

Figure 2:
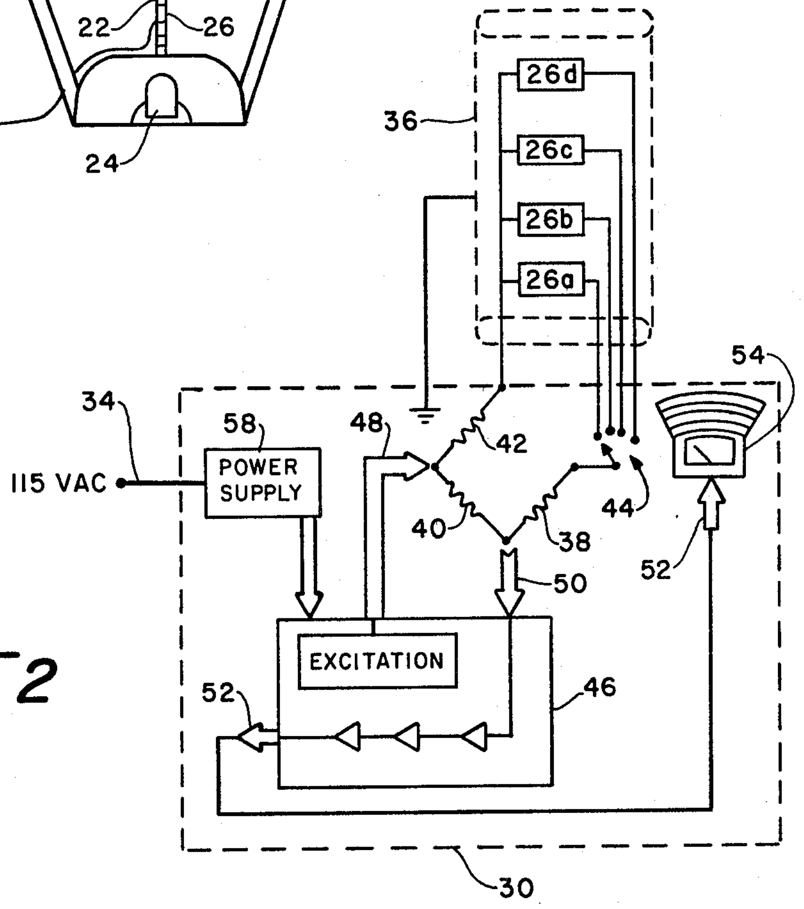
FIG. 2 is a circuit diagram of the pitch monitoring device utilizing four strain gages.

FIG. 2 is a schematic illustration of the system as it would be applied to four tympani. Strain gages 26*a*, 26*b*, 26*c*, 26*d*, are electrically connected in parallel and each adapted to be mounted on a single tympani. The strain gages employed are of the resistance foil type wherein a foil grid pattern is cemented to an epoxy base or carrier. The base is then bonded to rod 22 of the tympani and the entire gage electrically shielded by means of a suitable sheath 36, shown in dotted lines, to optimize operation. The sheath is grounded. Sheath 36 can be a foil strip covering the strain gage mounted on rod 22 and isolated from the tympani and the gage by applying an adequate insulator. This insulator will also serve to isolate the gage from damaging effects of the ambient moist air. Certain waxes work very well. A $\frac{3}{4}$ bridge circuit consisting of three resistors 38, 40 and 42, and a selected one of the strain gages, forms a Wheatstone bridge. The bridge provides a larger output signal than would be obtained by just using a single strain gage. One thousand ohm resistors were employed for one prototype. The Wheatstone bridge and associated circuitry provide an electrical output signal indicative of the tensile stress in rod 22. A selector switch 44 is employed to switch a desired one of the strain gages into the bridge circuit. Such bridge circuits are conventional and their theory of operation is well understood so no detailed description thereof is needed here. A signal conditioning module 46, which is a commercially available solid state device available as a chip, provides an excitation signal to the bridge circuit that is representd as arrow 48. In one operable prototype the excitation voltage was 10 volts DC. The output signal of the tension-sensing bridge circuit, represented by arrow 50, is connected into module 46 where it is conditioned to provide an output signal represented by arrow 52. Output signal 52 which was derived from signal 50 produced by the tension-sensing bridge circuit, provides information as to the strain measured by the selected strain gage. Output signal 52 is connected to voltmeter 54 whose meter movement provides a visual readout of the tensile forces present in rod 22. The voltmeter 54 has a face 56 which can be marked with the appropriate pitch designations by the tympanist.

Figure 3:
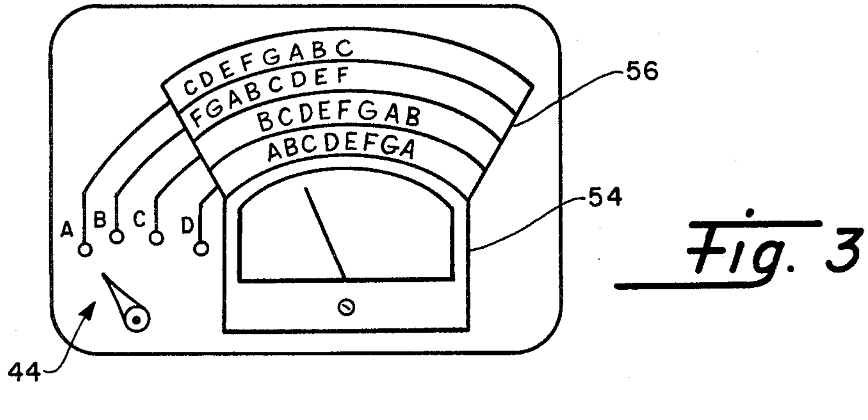
FIG. 3 is an enlarged view of the control and readout device illustrating how the musical pitch indications might be placed on the face thereof.

Switch 44 is positioned near the voltmeter 54 in control box 30, as shown in FIG. 3, with guidelines leading from the switch positions to the voltmeter face to allow the tympanist to tell at a glance which tympani is being monitored. Signal conditioning module 46 is supplied with power by a conventional power supply 58 that provides a regulated plus or minus 15 volts DC, plus a ground. Power supply 58 is used with the 115 volt AC supply normally availabe. Most of the components of the present system are contained in the control box 30. In FIG. 2 the components of the system that are physically contained in the control box 30 are shown enclosed by a dotted line labeled with the number 30 to represent the boundaries of the control box. Power supply 58 located within the confines of the control box can be plugged into a 115 VAC source via power cord 34.

Figure 4:
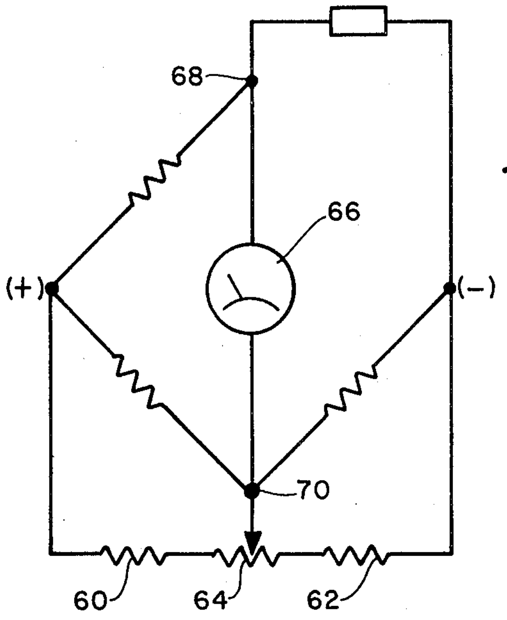
FIG. 4 is a circuit diagram illustrating bridge balancing circuitry for a circuit employing a single strain gage.

Bridge circuits used in various measuring applications must be balanced if their performance is to be optimized. This is well known and the literature that accompanies commercially available signal conditioning modules, like module 46, includes instructions on how to balance bridge circuits used in conjunction with the modules. FIG. 4 illustrates a bridge circuit provided with balancing circuitry consisting of fixed resistances 60 and 62, and potentiometer 64. A microvolt meter 66 is connected across terminals 68 and 70. The bridge is balanced when potentiometer 64 is adjusted so that microvolt meter 66 indicates zero current flow.

Figure 5:
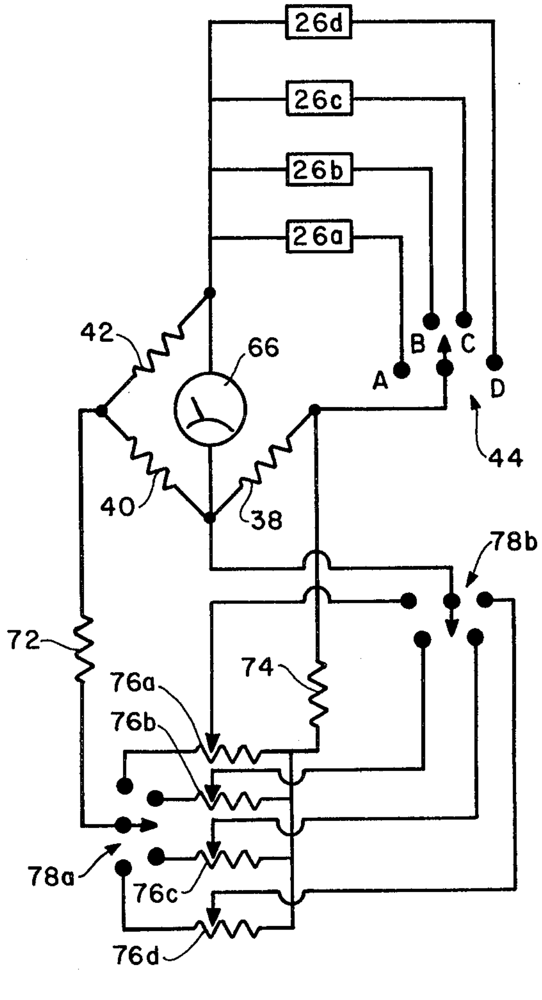
FIG. 5 is a circuit diagram illustrating bridge balancing circuitry for a system utilizing a plurality of strain gages.

When a plurality of strain gages are employed so that a plurality of tympani can be tuned, then it is desirable that there be some provision for balancing the bridge circuit for each strain gage. FIG. 5 illustrates a novel circuit that will permit balancing the bridge circuit for each of four strain gages, and switching the balancing circuitry into the bridge circuit when a particular strain gage is selected. The circuit includes fixed resistances 72 and 74 employed in conjunction with four potentiometers 76*a*, 76*b*, 76*c*and 76*d*. Gang switch means 78*a* and 78*b* are provided for inserting a selected one of the potentiometers into the circuit and removing the other three potentiometers. Switches 78*a* and 78*b* are also ganged with switch 44 so that when, for example, the tympani bearing strain gage 26*a* is selected for tuning, then potentiometer 76*a* is also selected and the resulting bridge circuit would be balanced. Assuming, of course, that potentiometer 76*a* had previously been adjusted so that there would be no current flowing between terminals 80 and 82. All four potentiometers are adjusted during the initial setup of the tuning device so that when each strain gage is selected into the bridge circuit, balancing circuitry is automatically selected also.

The operation of the system would be as follows, assuming that the control box is plugged in, the strain gages are properly installed on the tympani to be played, and the bridge circuit has been balanced for each strain gage. Usually the control box will be supported by a suitable stand 60 or mounted on a bracket (not shown) attached to the tympani. It is necessary that there be some initial calibration of the system when setting up an arrangement of tympani. Thereafter, recalibration should be required only at infrequent intervals. When a tympanum is replaced is one example of when retuning would be necessary. The initial calibration requires bringing in a piano or some other source of a particular tonal pitch to be used for comparison purposes. One of the tympani strain gages is switched into the bridge circuit and the tension in the tympanum adjusted until the selected pitch produced by the piano is matched by the tympani. For example, assume the tympani bearing strain gage 26*a* was selected by switching switch 44 to the A position and the key of G produced on the piano was matched on this tympani, as determined by the musical sense of the tympanist. The tympanist would then observe the position of the meter movement needle and mark the letter G on the face of the voltmeter at a position in alignment with the needle and the proper guideline from the switch position A. This procedure is then repeated for different pitches until the tympani has been tuned and the face of the voltmeter marked with the desired musical scale. Then the next tympani is switched in and the process repeated until the face of the voltmeter has been calibrated for all the tympani in use. A four tympani system is shown here only for the purpose of example, any desired number of tympani could be so monitored. After the initial calibration when the tympanist is playing a musical score that indicates a future change in tonal pitch, all the tympanist has to do is switch in each tympani and adjust the tympanum tension adjusting mechanism until the voltmeter needle points to the desired tonal pitch.

While a preferred embodiment of the invention has been disclosed herein, there are minor changes which can be made to the invention and other applications therefore that will be apparent to one skilled in the art to which the invention pertains. For example, the invention could be used in weapon systems research for designing structures containing members prone to destructive vibration, and monitoring resonance of certain members within a structure during operating conditions.

What is claimed is:

1. A pitch monitoring device for use with one or more pitched membrane percussion musical instruments, each instrument having a tympanum and an adjustable tuning mechanism connected to the tympanum for varying the tension in the tympanum to control the pitch of the instrument, and the adjustable tuning mechanism has a common structural member through which all tensile stress forces applied to the tympanum must pass, said device comprising:

transducer means for monitoring tensile stress in the common structural member of the adjustable tuning mechanism and providing an output signal that indicates the tensile stresses present in the common structural member, a signal conditioning module means connected to said transducer means for providing a regulated excitation voltage thereto, said module means further including signal conditioning circuitry connected to said transducer means for receiving the transducer means output signal and conditioning said transducer means output signal, and thereafter providing a conditioned signal representative of the tensile stresses measured by said transducer means, a regulated power supply connected to said signal conditioning module for providing power thereto, and readout means connected to said module means for receiving the conditioned output thereof and providing a visual indication of the pitch of the instrument being monitored.

2. The device recited in claim 1 wherein said transducer means includes:

a resistance-type electrical bridge circuit having a resistance-type strain guage as one component thereof, said strain gage being mounted on the common structural member in such manner that variations in the tensile stress therein will cause the resistance of the strain gage to vary and result in a corresponding change in the output signal of said transducer means.

3. The device recited in claim 2 wherein said transducer means includes:

a plurality of resistance-type strain gages connected in parallel, each of said strain gages being mounted on a different instrument, and selector switch means connected into the bridge circuit for selecting and inserting a desired one of said plurality of strain gages into the bridge circuit, whereby the pitch of a particular instrument can be monitored.

4. The device recited in claim 3 wherein said readout means is a voltmeter.

5. The device recited in claim 4 wherein the face of said voltmeter is calibrated in musical pitch notations so that the pitch of the instrument can be read out directly.

6. The device recited in claim 3 wherein said bridge circuit includes four resistance sections, three sections being formed by fixed resistances and the fourth section by a selected strain gage.

7. The device recited in claim 6 wherein balancing means are included in the bridge circuit for providing a balanced bridge circuit for each position of said selector switch.

8. A method for tuning tympani that have adjustable tensioning mechanisms for tensioning the tympanums thereof, and the tensioning mechanisms have a common structural member through which all tensile forces applied to the tympanum must pass, said method comprising the steps of:

selecting the particular tympani to be tuned, measuring the tensile stresses in the common structural member of the tympani adjustable tension mechanism for the tympani selected and providing an output signal indicative of the tensile stress, converting the tensile stress measurement signal into a readout signal indicative of the pitch of the tympani, and observing the readout signal on a visual readout means and adjusting the adjustable tensioning mechanism until a desired pitch indication is indicated on the visual readout means.

9. The method recited in claim 8 wherein the tensile stresses are measured using a transducer means that includes a resistance-type strain gage mounted on the common structural member of each tympani being monitored.

10. The method recited in claim 9 wherein the tensile stress measurement signal is conditioned by a conditioning module to provide a readout signal.

* * * * *